(12) United States Patent
McCain (10) Patent No.: US 12,138,975 B2
(45) Date of Patent: Nov. 12, 2024

(54) REMOVABLE LAMP HITCH MOUNTS

(71) Applicant: DIODE DYNAMICS, L.L.C., St. Charles, MO (US)

(72) Inventor: Paul Jerome McCain, St. Charles, MO (US)

(73) Assignee: Diode Dynamics, L.L.C., St. Charles, MO (US)

( * ) Notice: Subject to any disclaimer, the term of this patent is extended or adjusted under 35 U.S.C. 154(b) by 0 days.

(21) Appl. No.: 18/385,565

(22) Filed: Oct. 31, 2023

(65) Prior Publication Data
US 2024/0140155 A1     May 2, 2024

Related U.S. Application Data

(60) Provisional application No. 63/421,067, filed on Oct. 31, 2022.

(51) Int. Cl.
*B60D 1/60*     (2006.01)
*B60Q 1/26*     (2006.01)

(52) U.S. Cl.
CPC ............ *B60D 1/60* (2013.01); *B60Q 1/2661* (2013.01)

(58) Field of Classification Search
CPC ............ B60D 1/00–665; B60Q 1/2661; B60Q 1/2696; B60Q 1/30–307
See application file for complete search history.

(56) References Cited

U.S. PATENT DOCUMENTS

| | | | |
|---|---|---|---|
| 6,357,899 B1* | 3/2002 | Craven | B60Q 1/44 362/498 |
| 8,752,856 B2* | 6/2014 | Sarajian | B60D 1/605 280/507 |

OTHER PUBLICATIONS

Universal Hitch Reverse Light Kit; https://specialtyperformanceparts.com/products/universal-hitch-reverse-light-kit; web page accessed Oct. 20, 2022; 6 pgs.
2" Tow Hitch Receiver Mount Full LED Tail/Brake Light Kit; https://store.ijdmtoy.com/products/tow-hitch-receiver-led-lights-35-035; web page accessed Oct. 20, 2022; 7 pgs.
2" 4 Way Trailer Tow Hitch Cover Light 15 Led Light Stop Tail Light Brake Light; https://www.ebay.com/itm/234557101874; web page accessed Oct. 20, 2022; 4 pgs.

* cited by examiner

*Primary Examiner* — Jason M Han
(74) *Attorney, Agent, or Firm* — Harness, Dickey & Pierce, P.L.C.

(57) ABSTRACT

Lamp hitch mounts are provided for detachably coupling to hitch receivers. One example lamp hitch mount includes a body and a lamp. The body is configured to at least partially insert into a hitch receiver. The body includes multiple sides defining an opening. At least one side of the multiple sides includes a wall and a protrusion extending from the wall. The protrusion includes at least one interface tab configured to insert into an opening of the hitch receiver when the body is inserted into the hitch receiver. The lamp is coupled to the body and at least partially positioned in the opening of the body.

18 Claims, 6 Drawing Sheets

REMOVABLE LAMP HITCH MOUNTS

CROSS-REFERENCE TO RELATED APPLICATION

This application claims the benefit of, and priority to, U.S. Provisional Application No. 63/421,067 filed on Oct. 31, 2022. The entire disclosure of the above-referenced application is incorporated herein by reference.

FIELD

The present disclosure generally relates to removable lamp hitch mounts for attaching to vehicle hitch receivers.

BACKGROUND

This section provides background information related to the present disclosure which is not necessarily prior art.

Vehicles are known to include a hitch receiver for receiving a hitch, which is used, in general, to pull a trailer. The hitch is secured to the receiver with a hitch pin extending through openings on opposing sides of the hitch receiver and the hitch itself. The hitch pin may then be locked in place, via a hitch pin lock or otherwise, to lock the hitch in the receiver. A user may then attach a trailer to the hitch. When the hitch is not in use, the user may remove the hitch and insert a lamp into the hitch receiver. The lamp is likewise secured to (and sometimes locked into) the hitch receiver with the hitch pin extending through the openings of the hitch receiver and the lamp bracket.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, unless indicated as such below.

DETAILED DESCRIPTION

Example embodiments will now be described more fully with reference to the accompanying drawings. The description and specific examples included herein are intended for purposes of illustration only and are not intended to limit the scope of the present disclosure.

A lamp may be secured to a standard vehicle hitch receiver with a hitch pin extending through openings on sides of the lamp and the receiver. However, the standard vehicle hitch receiver (or tube) often includes inexact dimensions with respect to an interior size of the receiver and/or placement or depth of the receiver openings. For this reason, the lamp may vibrate or rattle in the receiver as a vehicle moves along a road. This is undesirable and may accelerate unnecessary wear of the lamp. To accommodate the inexact receiver openings, the lamp may include multiple openings on each side to allow a user to align a set of the lamp openings with the receiver openings. In the alternative, the user may be required to drill new openings in the lamp to ensure proper alignment with the receiver openings. This is problematic in that the users modifying the lamp may cause damage or be incorrect, in which case the incorrect holes cannot be undone. Such options for accommodating inexact receiver openings therefore are inconvenient for the user and require additional time and tools, and still may not address the inexact dimensions of the receiver. Further, regardless of whether the options for accommodating the inexact receiver openings are employed, additional hardware (the hitch pin and a clip to hold the hitch pin in place and/or a lock to retain the lamp (e.g., from theft, etc.)) are required to secure the lamp to the receiver.

Uniquely, the removable lamp hitch mounts described herein leverage various protrusions extending from sides of the mounts including multiple snap-in tabs structured to insert into openings of vehicle hitch receivers, thereby removably securing the lamp hitch mounts to the hitch receivers. In particular, the lamp hitch mounts have multiple sides and multiple protrusions extending from the sides. The protrusions may include an interface tab configured to be displaced into an opening of the hitch receiver and secure the lamp hitch mount to the receiver (e.g., independent of or without use of a separate hitch pin, clip, lock, etc.). The lamp is then secured to the lamp hitch mount. With this configuration, a user can more easily secure and/or remove the lamp hitch mount (and lamp) to and/or from a hitch receiver (e.g., a standard vehicle hitch receiver, etc.), while ensuring minimal movement of the mount in the receiver regardless of inexact dimensions of the receiver. The lamp hitch mounts provide a low-cost, convenient solution of securing the mounts to hitch receivers without additional components such as hitch pins, clips, and/or locks, while also limiting vibration or rattling of the lamp when mounted.

Figure 1A:
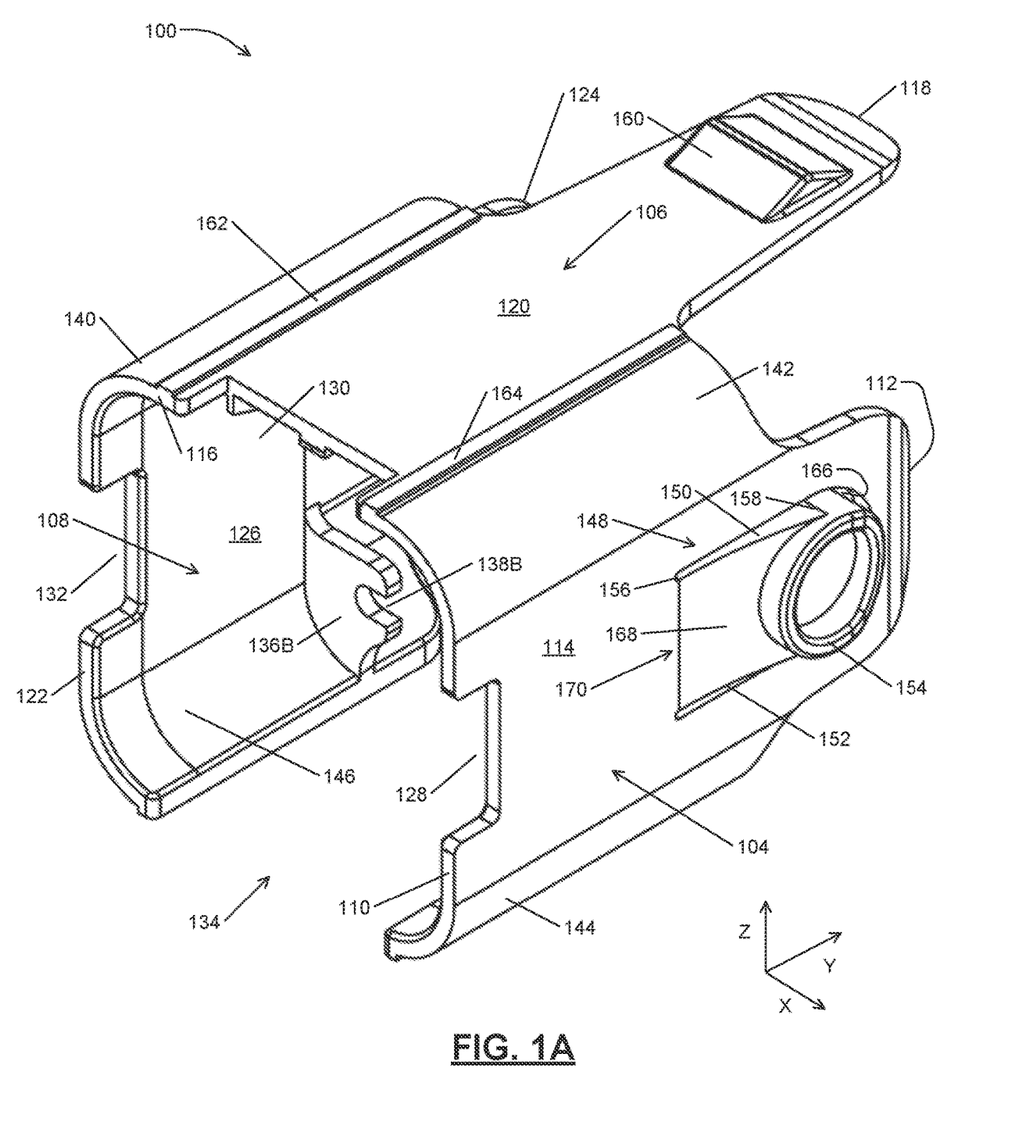
FIGS. 1A-1B are isometric views of an example lamp hitch mount of the present disclosure.
Figure 1B:
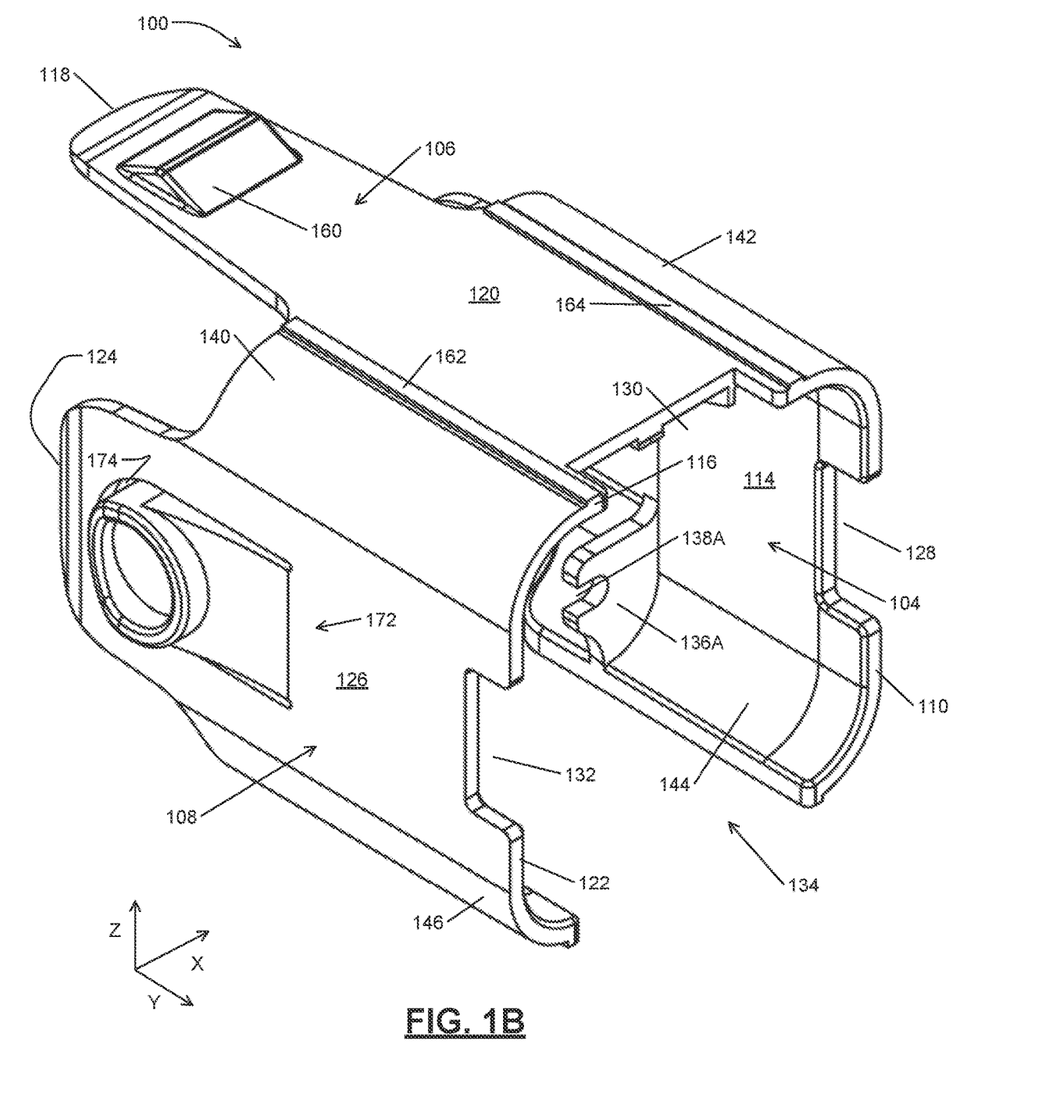

FIGS. 1A-1B illustrate an example body 100 of a lamp hitch mount including one or more aspects of the present disclosure, for use in connection with a vehicle hitch receiver (e.g., a standard vehicle hitch receiver, other vehicle hitch receivers, etc.). Although the body (as also referred to as a lamp hitch mount) 100 is presented in one specific arrangement in FIGS. 1A-1B, other embodiments may include the body 100 arranged otherwise depending on, for example, the shape, size, configuration, etc. of vehicle hitch receivers for which the body 100 is to be used (or desired to be used), lamps used with the mounts, etc.

As shown in FIGS. 1A-1B, the illustrated body 100 generally includes three sides 104, 106, 108. The body 100 is configured (e.g., sized, shaped, etc.) to at least partially insert into a hitch receiver (not shown in this figure). For example, the sides 104, 106, 108 may be sized, shaped, positioned relative to each other, etc. to generally define a shape of the body 100 that substantially corresponds to an interior channel of the hitch receiver (or tube). In this embodiment, the sides 104, 106, 108 form a general squared-U cross section (e.g., for use with a hitch receiver defining a generally box-shaped receptacle, etc.), but may form other shapes, as suitable for particular hitch receivers (and/or shapes of receiving tubes defined thereby, etc.).

The sides 104, 106, 108 each generally include walls (broadly, members) defined by opposing ends (or edges). For example, the side 104 includes a wall 114 defined by opposing ends (or edges) 110, 112, the side 106 includes a wall 120 defined by opposing ends (or edges) 116, 118, and the side 108 includes a wall 126 defined by ends (or edges) 122, 124. When the body 100 is inserted into the hitch receiver, the ends 112, 118, 124 of the sides 104, 106, 108 are generally the first portions of the body 100 to enter the hitch receiver.

As shown, the side (or top side) 106 of the body 100 is generally positioned between and adjacent to the opposing sides 104, 108. More specifically, the side 106 is coupled to the sides 108, 104, in this example embodiment, via curved corner members 140, 142, respectively. The sides 108, 104 then extend from the curved corner members 140, 142 in generally parallel planes (in the Z and Y directions as shown in FIGS. 1A-1B), which are substantially perpendicular to the side 106 (extending in the X and Y directions as shown in FIGS. 1A-1B). Additionally, the body 100 further includes curved corner members 144, 146 extending from the sides 104, 108, respectively. With that said, it should be appreciated that the sides 104, 106, 108 and/or the curved corner members 140, 142, 144, 146 may be configured and/or structured and/or shaped differently. For example, in some embodiments, the side 106 may be directly coupled to the sides 104, 108 (e.g., without the corner members 140, 142, etc.) to form a more squared edge therebetween, one or more of the corner members 140, 142, 144, 146 may be planar (instead of curved), etc. Further, in other embodiments, the body 100 may include another side (or bottom side) opposing the side 106 and generally positioned between and adjacent to the opposing sides 104, 108.

The side 106 of the body 100 is generally longer than the opposing sides 104, 108. For example, as shown in FIGS. 1A-1B, the distance between the opposing ends 116, 118 of the side 106 is greater than the distance between the opposing ends 110, 112 of the side 104 and the distance between the opposing ends 122, 124 of the side 108. With this configuration, the side 106 may provide support for the body 100 when the body 100 is inserted into the hitch receiver. Although the side 106 is shown and described as extending a greater distance than the sides 104, 108, it should be appreciated that the sides 104, 106, 108 may be sized otherwise depending on, for example, the size, configuration, etc. of the hitch receiver, etc. For example, each of the sides 104, 106, 108 may be the same (or substantially the same) length, the side 106 may be shorter than the side 104 and/or the side 108, etc. In general, the length of the sides may be defined based on the particular geometries of the hitch receiver (e.g., the position of holes therein, etc.) and/or the lamp to be included therein.

The body 100 is configured to couple (e.g., detachably couple, etc.) to a lamp. For example, and as further explained herein, the ends 110, 116, 122 and the walls 114, 120, 126 of the sides 104, 104, 106 are sizes, shaped, etc. to abut against a lamp when the lamp is attached to the body 100. In connection therewith, the sides 104, 106, 108 define recesses 128, 130, 132 and an opening 134, as shown in FIGS. 1A-1B. More specifically, the ends 110, 116, 122 of the sides 104, 106, 108 define the recesses 128, 130, 132 and the ends 110, 116, 122 and portions of the walls 114, 120, 126 define the opening 134. As further explained herein, the recesses 128, 130, 132 are configured to receive mounting clips of a lamp and the opening 134 is configured to receive a portion (e.g., a body, etc.) of the lamp when the lamp is attached to the body 100. As such, it should be appreciated that the particular shape and dimensions of the ends 110, 116, 122 and the walls 114, 120, 126 of the sides 104, 104, 106 may be modified in other lamp hitch mount embodiments as necessary or desired to receive, engage or secure a desired lamp to the body 100.

Additionally, the body 100 includes brackets 136A, 136B extending into the opening 134 from the sides 104, 108. As shown, each bracket 136A, 136B defines a recess 138A, 138B. As shown, the brackets 136A, 136B are mirror images of and/or symmetric to each other. The brackets 136A, 136B are structured to abut against the body of the lamp when the lamp is attached to the body 100, while the recesses 138A, 138B of the brackets 136A, 136B are configured to provide an avenue for accommodating portions of the lamp. Further, one or both brackets 136A, 136B may include one or more openings (not shown) arranged to receive one or more fastening devices (e.g., a screw, a bolt, etc.). In this manner, the lamp and the body 100 can be attached together through the fastening device(s) passing through the opening(s) of the brackets 136A, 136B and into the lamp. Although the brackets 136A, 136B are presented in one specific arrangement in FIGS. 1A-1B, other embodiments may include one or both brackets 136A, 136B arranged, sized, shaped, etc. otherwise depending on, for example, the shape, size, configuration, etc. of the lamp, etc.

With continued reference to FIGS. 1A-1B, the body 100 includes one or more protrusions extending from and/or adjacent to the walls 114, 120, 126. As further explained herein, the protrusions are configured to insert into openings of the hitch receiver and abut against inner surfaces of the hitch receiver openings, etc. through applied tension. With this structure, the body 100 may be secured within the hitch receiver without additional hardware such as hitch pins and clips, while also experiencing minimal vibration or rattling.

For example, the side 104 includes a protrusion 148 extending along and from the wall 114 near the end 112. Specifically, as shown in FIG. 1A, the wall 114 defines an opening 166 extending therethrough. The protrusion 148 extends from the wall 114 and into the opening 166. The protrusion 148 generally includes an elongated member 168 having two opposing inclined surfaces (or walls or ramps) 150, 152, and an interface tab 154 extending from the elongated member 168. The elongated member 168 generally extends from a portion 170 of the wall 114 (and in line with the wall 114) and into the opening 166 (such that the member 168 and/or tab 154 are resiliently moveable into and/or out of the opening 166, etc.). Each inclined surface 150, 152 generally extends along an outer surface of the elongated member 168, and away from the outer surface of the wall 114 at an increasing distance. For example, the inclined surface 150 includes opposing portions (or ends) 156, 158. The portion 158 of the inclined surface 150 facing (or closer to) the end 112 of the side 104 extends a greater distance away from the wall 114 than the portion 156 of the inclined surface 150 facing (or closer to) the end 110. The inclined surface 152 may be similarly arranged. The interface tab 154 then is positioned at an end portion of the elongated member 168 (adjacent to the portion 158 of the inclined surface 150 and a similar portion of the inclined surface 152). Although the protrusion 148 is presented in one specific arrangement in FIG. 1A, other embodiments may include the protrusion 148 arranged, sized, shaped, etc.

otherwise depending on, for example, the shape, size, configuration, etc. of the hitch receiver, etc. For example, the protrusion 148 may include one of the inclined surfaces (e.g., the inclined surface 150, etc.), the interface tab 154 positioned at another portion of the elongated member 168, etc.

The interface tab 154 is configured to insert into an opening of the hitch receiver. More specifically, this opening of the hitch receiver is one of multiple openings used to receive a hitch pin when a hitch is secured to the hitch receiver. Thus, when the body 100 is inserted into the hitch receiver, the interface tab 154 biases inwardly (e.g., by a user pressing the interface tab 154, etc.) to permit the interface tab 154 to pass into the hitch receiver opening. The body 100 is pushed (by the user) into the hitch receiver until the interface tab 154 is aligned with the hitch mount opening used to receive the hitch pin, whereupon the interface tab 154 is no longer restricted by the inner surface of the hitch receiver and enters the opening of the hitch receiver otherwise used to receive a hitch pin (e.g., based on the elasticity of the interface tab 154, resiliency of the interference tab 154, etc.). The interface tab 154 is mounted in the opening until a user presses on the interface tab 154 inward, again, to clear the inner surface of the hitch receiver. In this manner, the interface tab 154 functions to hold, secure, etc. the body 100 (more generally, the lamp hitch mount) in the hitch receiver, as further explained below. In this way, the interference tab 154 may define a resiliently moveable member or spring member, etc. (e.g., such that tab 154 and/or member 168 are moveable relative to the side 104 into and/or out of the opening 166, etc.). As such, the interference tab 154 is configured to selectively be positioned into (and removed from) the desired opening(s) of the hitch receiver.

In various embodiments, the interface tab 154 may substantially correspond to the opening of the hitch receiver. For example, the interface tab 154 includes a circular shape having an outer diameter substantially corresponding to an inner diameter of the opening in the hitch receiver. In this manner, when the interface tab 154 is inserted into the opening, the interface tab 154 may tightly fit into the opening, thereby reducing or restricting movement of the body 100 (and more generally, the lamp hitch mount). Although the interface tab 154 is presented in one specific arrangement in FIG. 1A, other embodiments may include the interface tab 154 arranged, sized, shaped, etc. otherwise depending on, for example, the shape, size, configuration, etc. of the opening in the hitch receiver.

Additionally, the interface tab 154 is generally held (e.g., resiliently held, etc.) in the opening of the hitch receiver by tension. For example, the protrusion 148 may be formed of a resilient material such as a plastic material, etc. In various embodiments, the plastic material may be, for example, polyamide such as polyamide 66 (PA66) or another suitable material. As indicated above, when the body 100 is inserted into and moved within the hitch receiver, the protrusion 148 near the end 112 flexes inward into the opening 166 (e.g., towards the opening 134, etc.) due to, for example, the interface tab 154 pressuring against the inner surface of the hitch receiver. The user may have to apply, for example, about 10 lbs. per square inch (or more or less). In some embodiments, the user may have to apply a force ranging between, for example, about 20-30 Newtons, or more or less, or specifically, about 25 Newtons, etc. to depress the protrusion 148. When the interface tab 154 aligns with the opening in the hitch receiver, the protrusion 148 springs back towards the inner surface of the hitch receiver (e.g., due to the resiliency of the protrusion 148, etc.), thereby causing the interface tab 154 to snap into the opening.

This movement of the protrusion 148 also causes portions of the inclined surfaces 150, 152 to engage the inner surface of the hitch receiver. Due to the configuration of the inclined surfaces 150, 152 and their engagement with the inner surface of the hitch receiver, the protrusion 148 is prevented from reverting back to its static state. In this manner, the protrusion 148 applies tension to the interface tab 154, thereby forcing the interface tab 154 to remain in the opening. If it is desired to remove the body 100 (more generally, the lamp hitch mount) from the hitch receiver, the user is able to apply pressure against the interface tab 154 (e.g., to overcome the tension or resilience of the interface tab material, etc.) causing the protrusion 148 near the end 112 to flex inward into the opening 166 until the tab 154 is sufficiently clear of the opening in the hitch receiver and then pull the body 100 out of the hitch receiver.

As shown in FIG. 1B, the side 108 also includes a protrusion 172 extending along and from the wall 126. More specifically, the protrusion 172 extends from (and in line with) the wall 126 and into an opening 174 defined by the wall 126. The protrusion 172 is structured in the same manner as the protrusion 148 extending from the outer surface of the wall 114. In this exemplary embodiment, the protrusion 172 includes an interface tab that is a mirror image of the interface tab 154 and structured to insert into another opening in the hitch receiver otherwise used to receive a hitch pin on the opposite side thereof. Additionally, the interface tab of the protrusion 172 is generally held in its corresponding opening of the hitch receiver by tension due to, for example, resilient characteristics of the interface tab and/or the protrusion 172 on side 108, as explained above relative to the side 104, the protrusion 148, and the interface tab 154.

In some embodiments, one or both protrusions 148, 172 may be arranged to receive one or more theft prevention devices. For example, the elongated member 168 of the protrusion 148 may define an opening extending therethrough. The opening of the elongated member 168 may be within (e.g., concentric to, etc.) the interface tab 154 or in another suitable area. The protrusion 172 may be similarly arranged. A user then can attach a theft prevention device (e.g., a lock such as a padlock, a locking hitch pin, etc.) through the opening of the protrusion 148 (and/or an opening of the protrusion 172) if desired.

As shown in FIGS. 1A-1B, the side 106 also includes a protrusion 160 extending from its wall 120 near the end 118. In this example embodiment, the protrusion 160 has a generally triangular prism shape (or triangular cross section) including a top region and surfaces extending from the top region and away from each other. Although the protrusion 160 is shown and described in one specific arrangement in FIGS. 1A-1B, other embodiments may include the protrusion 160 arranged, sized, shaped, etc. otherwise depending on, for example, the shape, size, configuration, etc. of the hitch receiver.

The protrusion 160 is configured to engage the hitch receiver when the body 100 is inserted into the hitch receiver. For example, the side 106 may be formed of a resilient material in a similar fashion as the side 104 (and/or the side 108). When the body 100 is inserted into and moved within the hitch receiver, the side 106 near the end 118 may flex inward due to, for example, the protrusion 160 pressuring against a top (or bottom) inner surface of the hitch receiver. The protrusion 160 may remain pressed against the inner surface of the hitch receiver, thereby preventing the side 106 from reverting back to its static state. In this manner, the side 106 applies tension to the protrusion 160 against the inner surface of the hitch receiver.

Additionally, the body 100 also includes guide rails 162, 164 (broadly, protrusions) extending at least partially along and adjacent to the wall 120 of the side 106. More specifically, the guide rails 162, 164 extend along ends of the curved corner members 140, 142 adjacent to the wall 120 of the side 106. The guide rails 162, 164 are generally raised protrusions extending above the wall 120, such that the guide rails 162, 164 generally abut against and move along the top (or bottom) inner surface of the hitch receiver when the body 100 is inserted into and moved within the hitch receiver. In this manner, the guide rails 162, 164 are structured (e.g., sized, shaped, arranged, etc.) to provide support for and proper alignment of the body 100 when the body 100 is inserted into and moved within the hitch receiver (e.g., by holding the body 100 in the correct alignment relative to one or more openings in the hitch receiver or the hitch receiver, in general, etc.). For example, due to their configuration, the guide rails 162, 164 may provide support by acting as a uniform point of interference between the body 100 and the top (or bottom) inner surface of the hitch receiver, thereby engaging with the inner surface of the hitch receiver without damaging the body 100 during repeated cycles of insertion and removal.

Figure 2A:
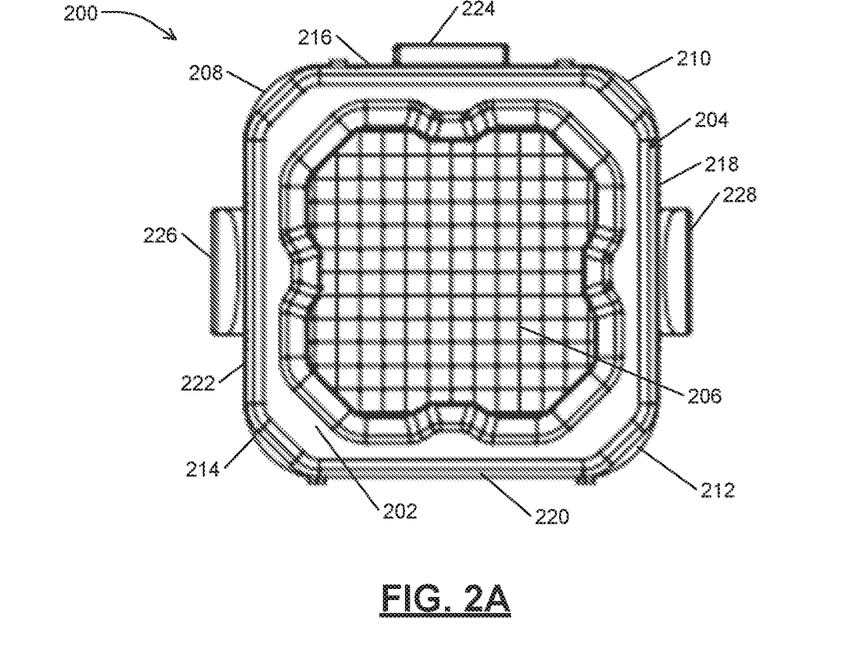
FIG. 2A is a front view of an example lamp to be mounted in a lamp hitch mount of the present disclosure.

FIG. 2A illustrates an example lamp 200 including one or more aspects of the present disclosure, for use in connection with a body (e.g., the body 100 of FIGS. 1A-1B, etc.) of a hitch mount. The lamp 200 may be, for example, an aftermarket auxiliary lamp (e.g., a standard aftermarket lamp, an aftermarket lamp adapted to be compatible with the body 100, etc.) providing a white reverse light, a red accent light, a red brake light, etc. Although the lamp 200 is described and presented in one specific arrangement in FIG. 2A, other embodiments may include the lamp arranged otherwise depending on, for example, the shape, size, configuration, etc. of corresponding hitch mounts, vehicle hitch receivers, etc.

As shown, the lamp 200 generally includes a body 202 defined by an outer perimeter 204. The body 202 houses one or more light sources (not shown) such as LEDs, etc. For example, in FIG. 2A, the one or more light sources are generally positioned in the body 202 behind an outer covering (or lens) 206. The outer perimeter 204 generally includes four curved corner regions 208, 210, 212, 214 and four generally planar sides 216, 218, 220, 222 each extending between two of the curved corner regions 208, 210, 212, 214. The curved corner regions 208, 210, 212, 214 are generally shaped, sized, etc. to correspond to portions of a hitch mount body (e.g., edges of the curved corner members 140, 142, 144, 146 of the body 100 in FIGS. 1A-1B, etc.). The body 202 of FIG. 2A further includes clips 224, 226, 228 generally extending from the outer perimeter 204. More specifically, the clip 224 extends from the side 216, the clip 226 extends from the side 222, and the clip 228 extends from the side 218. The clips 224, 226, 228 are generally shaped, sized, etc. to correspond to portions of a hitch mount body (e.g., the recesses 128, 130, 132 of the body 100 in FIGS. 1A-1B, etc.).

The lamp 200 is configured to detachably couple to a hitch mount body (e.g., the body 100 of FIGS. 1A-1B, etc.). For example, the clips 224, 226, 228 may function as mounting clips. In such arrangements, the clips 224, 226, 228 may be formed with a resilient material, thereby allowing the clips 224, 226, 228 to flex (e.g., inward towards the body 202 of the lamp 200, etc.) when pressure is applied to the clips 224, 226, 228. Thus, when the clips 224, 226, 228 are aligned and inserted into, for example, the recesses 128, 130, 132 of the body 100 in FIGS. 1A-1B, the clips 224, 226, 228 may be forced inward and inside of the ends 110, 116, 122 of the body 100 and held in place with tension applied by the clips 224, 226, 228 pressuring against the body 100. Then, the user can detach the lamp 200 from the body 100 by pressing the clips 224, 226, 228 inward (towards the body 202 of the lamp 200), thereby releasing the tension between the clips 224, 226, 228 and the body 100.

Figure 2B:
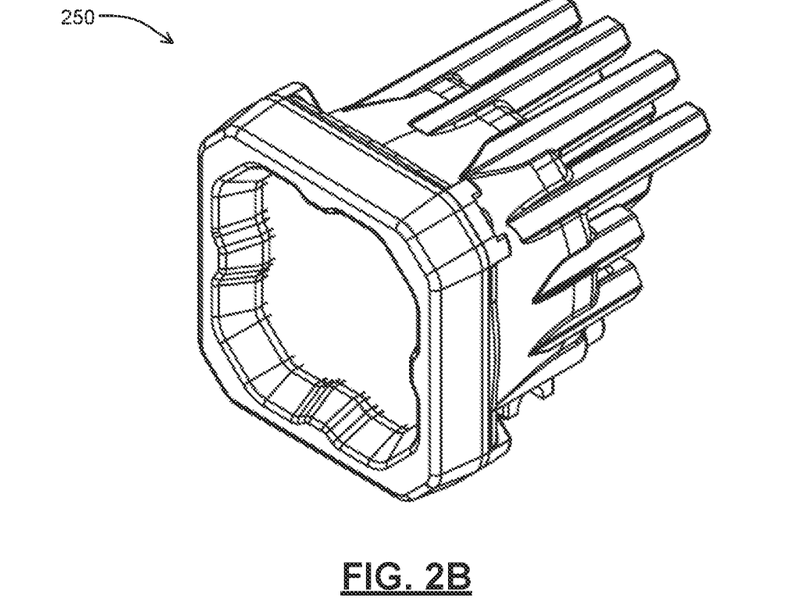
FIG. 2B is an isometric view of another example lamp to be mounted in a lamp hitch mount of the present disclosure.

In other embodiments, the lamp 200 is configured to detachably couple to a hitch mount body (e.g., the body 100 of FIGS. 1A-1B, etc.) via one or more fastening devices (e.g., screws, bolts, etc.). For example, after the lamp 200 is inserted into the hitch mount body, a user can attach the lamp 200 to the hitch mount body by inserting fastening devices through openings of the body (e.g., openings in the brackets 136A, 136B of FIGS. 1A-1B, etc.). Then, if desired, the user can detach the lamp 200 from the hitch mount body by removing the fastening devices and separating the lamp 200 from the hitch mount body. In such embodiments, the lamp 200 may or may not include the clips 224, 226, 228. For example, FIG. 2B illustrates a lamp 250 substantially similar to the lamp 200 of FIG. 2A, but without clips generally extending from an outer perimeter of the lamp 250.

Figure 3:
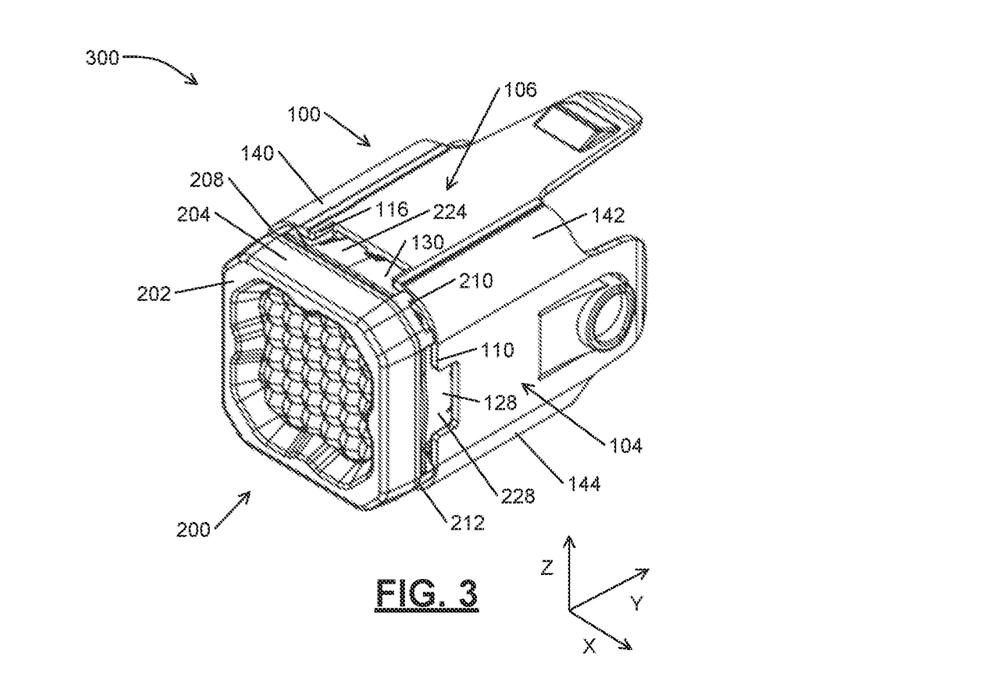
FIG. 3 is an isometric view of an example assembly including the lamp hitch mount of FIGS. 1A-1B with the lamp of FIG. 2A coupled thereto.
Figure 4:
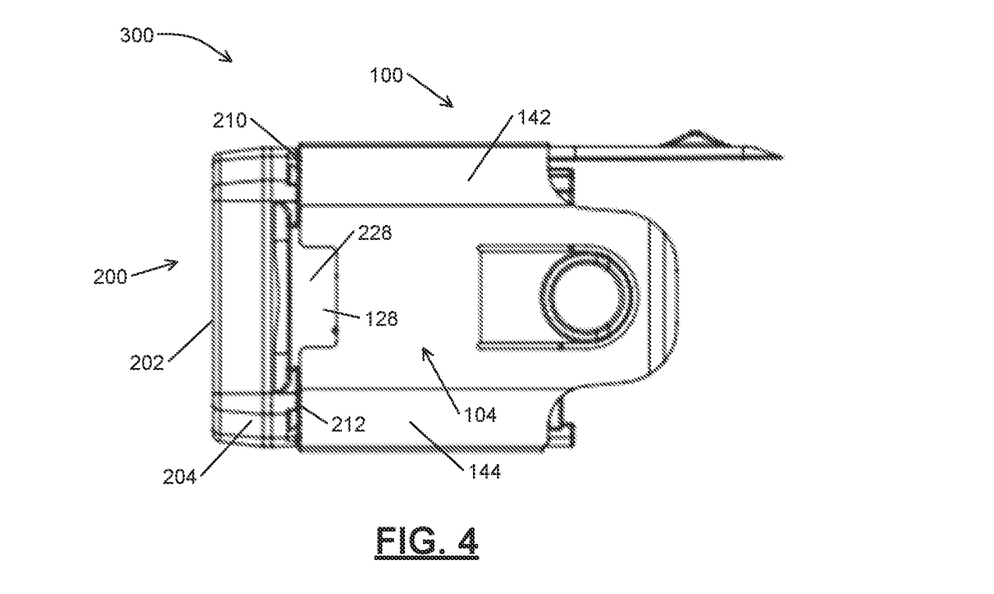
FIG. 4 is a side view of the lamp hitch mount of FIG. 3.

FIGS. 3-4 illustrates an example assembly 300 including one or more aspects of the present disclosure, for use in connection with a vehicle hitch receiver (e.g., a standard vehicle hitch receiver, etc.). Although the assembly 300 is presented in one specific arrangement in FIGS. 3-4, other embodiments may include the assembly 300 arranged otherwise depending on, for example, the shape, size, configuration, etc. of vehicle hitch receivers, lamps used with the mounts, etc.

As shown in FIGS. 3-4, in this example embodiment, the assembly 300 generally includes the body 100 of FIGS. 1A-1B and the lamp 200 of FIG. 2A detachably coupled to the body 100. More specifically, the lamp 200 is positioned in the opening 134 (not visible in FIGS. 3-4) of the body 100 such that a portion of the body 202 of the lamp 200 generally abuts against the brackets 136A, 136B (not visible in FIGS. 3-4) of the body 100 and the outer perimeter 204 of the lamp 200 generally abuts against the ends 110, 116, 122 of the sides 104, 106, 108 (more generally, a front end of the body 100). In such examples, the outer perimeter 204 of the lamp 200 is generally shaped, sized, etc. to correspond, align with, etc. the front end of the body 100. For example, the curved corner regions 208, 210, 212, 214 of the outer perimeter 204 are generally shaped, sized, etc. to correspond to, align with, etc. the corner members 140, 142, 144, 146.

When attaching the lamp 200 to the body 100, a user may insert and push the body 202 of the lamp 200 in the opening 134 of the hitch mount body 100. When the clips 224, 226, 228 approach, enter, etc. the recesses 128, 130, 132 of the body 100, the user may press on (or otherwise applies a force to, etc.) the clips 224, 226, 228 causing the clips 224, 226, 228 to flex inwards towards the body 202 of the lamp 200 and away from the ends 110, 116, 122 of the body 100.

Once the clips 224, 226, 228 clear the ends 110, 116, 122 of the body 100, the user may release pressure from the clips 224, 226, 228 and push the body 202 of the lamp 200 until a portion of the body 202 of the lamp 200 generally abuts against the brackets 136A, 136B of the body 100 and the outer perimeter 204 of the lamp 200 generally abuts against the ends 110, 116, 122 of the body 100. Due to the resilient characteristics of the clips 224, 226, 228, the lamp 200 is securely attached to the body 100.

When detaching the lamp 200 from the body 100, the user may press on (or otherwise applies a force to, etc.) the clips 224, 226, 228 causing the clips 224, 226, 228 to flex inwards towards the body 202 of the lamp 200 and away from the ends 110, 116, 122 of the body 100. At the same time, the user may pull the lamp 200, thereby releasing the lamp 200 from the body 100.

In other embodiments, the user can attach (or detach) the lamp 200 to (or from) the body 100 by inserting (or removing) fastening devices through (or from) an opening in the brackets 136A, 136 B (not shown in FIGS. 3-4), as explained above.

With either arrangement, a user can easily detach the lamp 200 from the body 100, and if desired attach another different lamp to the body 100 and/or attach the lamp 200 to another different hitch mount body. In this manner, the hitch mount body 100 (or any other hitch mount body herein) may be interchangeable with different lamps, thereby permitting users to attach different models of lamps to achieve different functions, output colors, output beam patterns, etc.

Figure 5:
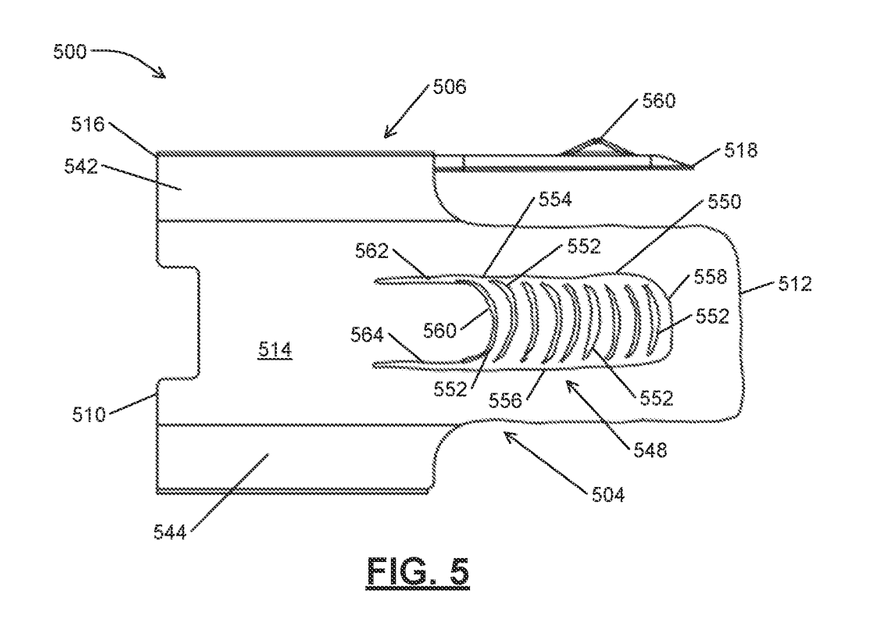
FIG. 5 is a side view of an example lamp hitch mount of the present disclosure.

FIG. 5 illustrates an example body 500 of a lamp hitch mount including one or more aspects of the present disclosure, for use in connection with a vehicle hitch receiver (e.g., a standard vehicle hitch receiver, etc.). Although the body (or hitch mount body) 500 is presented in one specific arrangement in FIG. 5, other embodiments may include the body 500 arranged otherwise depending on, for example, the shape, size, configuration, etc. of vehicle hitch receivers, lamps used with the mounts, etc.

The body 500 of FIG. 5 is generally similar to the body 100 of FIGS. 1A-1B, but includes differently structured interface tabs, which include protrusions structured to insert into openings in a hitch receiver. Specifically, in this example, the body 500 generally includes a side 504, a side (not visible in FIG. 5) opposing the side 504, and a side 506 having a protrusion 560 extending therefrom. Additionally, the body 500 includes curved corner members 542, 544 generally positioned between and/or adjacent to the sides 504, 506. The body 500 is structured (e.g., sized, shaped, etc.) to at least partially insert into a hitch receiver (not shown). For example, the sides 504, 506 are sized, shaped, positioned relative to each other, etc. to generally define a shape of the body 500 that substantially corresponds to an interior channel of the hitch receiver (or tube). In the illustrated embodiment of FIG. 5, the sides 504, 506, the protrusion 560, and the curved corner members 542, 544 correspond to, for example, the sides 104, 106, the protrusion 160, and the curved corner members 142, 144 of FIGS. 1A-1B.

The side 504 generally includes a wall 514 defined by opposing ends (or edges) 510, 512. The other opposing side (not visible) may include a similar wall structure. When the body 500 is inserted into the receiver, the end 512 of the side 504 is the first portion of the side 504 to enter the receiver.

As shown, the side 504 is longer than the side 506. For example, the distance between the opposing ends 510, 512 of the side 504 is slightly greater than the distance between opposing ends 516, 518 of the side 506. The other opposing side may be similarly arranged and therefore slightly longer than the side 506 as well. Although the sides 504, 506 are presented in one specific arrangement in FIG. 5, other embodiments may include the sides arranged, sized, shaped, etc. otherwise. For example, the side 504 (and/or its opposing side) may be the same length as the side 506, shorter than the side 506, etc.

With continued reference to FIG. 5, the side 504 includes a protrusion 548 extending along and from the wall 514. For example, the protrusion 548 extends from the wall 514 and into an opening defined by the wall 514, in a similar fashion as explained above relative to the protrusions 148, 172 and the openings 166, 174 of FIGS. 1A-1B. The protrusion 548 generally includes a base (or a frame, an elongated member) 550 and multiple curved (or semi-circular) interface tabs 552 extending from the base 550 (e.g., nine tabs in the illustrated embodiment, etc.). As shown, the base 550 includes parallel sides 554, 556 extending from the wall 514, a curved end 558 connecting one end of each parallel side 554, 556, and another opposing curved end 560. The parallel sides 554, 556 extend beyond the curved end 560 to generally form parallel arms 562, 564 facing the end 510 of the side 504. Although the protrusion 548 is presented in one specific arrangement in FIG. 5, other embodiments may include the protrusion 548 arranged, sized, shaped, etc. otherwise depending on, for example, the shape, size, configuration, etc. of the hitch receiver, etc. For example, the protrusion 548 may include more or less than nine interface tabs (e.g., one curved interface tab 552, twelve interface tabs 552, etc.), different ends (e.g., straight ends, etc.), etc.

The interface tabs 552 of FIG. 5 are generally spaced apart from each other such that the distance between each interface tab 552 is substantially equal. In other embodiments, the interface tabs 552 may be spaced apart at unequal distances.

The interface tabs 552 are configured to insert into (or engage, etc.) an opening of the hitch receiver. This opening of the hitch receiver is one of multiple openings used to receive a hitch pin when a hitch is secured to the hitch receiver. Thus, when the body 500 is inserted into the hitch receiver, any one of the interface tabs 154 enters the same opening of the hitch receiver otherwise used to receive a hitch pin.

Each curved interface tab 552 substantially corresponds to the opening of the hitch receiver. For example, each curved interface tab 154 has a curvature that substantially corresponds to a curvature of the opening in the hitch receiver. In this manner, when any one of the interface tabs 552 is inserted into the opening and the body 500 is inserted as permitted, the interface tab 552 tightly fits into the opening when the insertion is complete with one of the interface tabs 552 entering into the opening of the hitch receiver, thereby restricting movement of the body 500 (more generally, the lamp hitch mount) relative to the hitch receiver. Although the interface tabs 552 are presented in one specific arrangement in FIG. 5, other embodiments may include the interface tabs 552 arranged, sized, shaped, etc. otherwise depending on, for example, the shape, size, configuration, etc. of the opening in the hitch receiver. The interface tabs 552 are arranged on the base 550 to provide a series of progressive retention points. For example, and as further explained below, when a user inserts the body 500 into the hitch receiver, the user may adjust the position of the body 500 such that any one of the interface tabs 552 aligns with the opening of the hitch receiver. This progressive arrangement of the interface tabs 552 further allows a user to adjust the position of the body 500 as necessary to account for situations where the opening in the hitch receiver deviates from a standard location (e.g., the depth of the opening deviates from a standard location, etc.).

Additionally, the interface tabs 552 are generally held in the opening of the hitch receiver by tension in a similar manner as explained above relative to FIGS. 1A-1B. For example, the protrusion 548 may be formed of a resilient material (e.g., such that the protrusion 548 may be selectively deformable relative to the wall 514 and/or such that each of the tabs 552 may be selectively deformable relative to an adjacent one of the tabs 552, etc.). When the body 500 is inserted into and moved within the hitch receiver, the protrusion 548 (e.g., the interface tabs 552, etc.) flexes by pressure from the user to clear the inner surface of the hitch receiver. For example, the user may have to apply a force of about 10 lbs. per square inch, or a force ranging between about 20-30 Newtons or more or less, or specifically, about 25 Newtons, etc. to move the protrusion 548 relative to the body. When one of the interface tabs 552 aligns with the opening in the hitch receiver, the protrusion 548 springs back towards the inner surface of the hitch receiver, thereby causing that interface tab 552 to snap into the opening. Due to its configuration, the protrusion 548 is prevented from reverting back to its static state. In this manner, the protrusion 548 applies tension to the interface tab 552, thereby forcing the interface tab 552 to remain in the opening. If it is desired to move the body 500 (more generally, the hitch mount) further into the hitch receiver so that another one of the interface tabs 552 aligns with the opening in the hitch receiver, the user can press against the interface tab 552 currently in the opening (e.g., to overcome the applied tension, etc.). This causes the protrusion 548 to flex inward. When the interface tab 552 currently in the opening is sufficiently clear of the opening, the user can move the body 500 until another one of the interface tabs 552 aligns with the opening in the hitch receiver.

Additionally, if it is desired to remove the body 500 (more generally, the hitch mount) from the hitch receiver, the user can press against the interface tab 552 currently in the opening (e.g., to overcome the applied tension, etc.). As a result, the protrusion 548 flexes inward. When the tab 552 is sufficiently clear of the opening in the hitch receiver, the user can pull the body 500 out of the hitch receiver.

Figure 6:
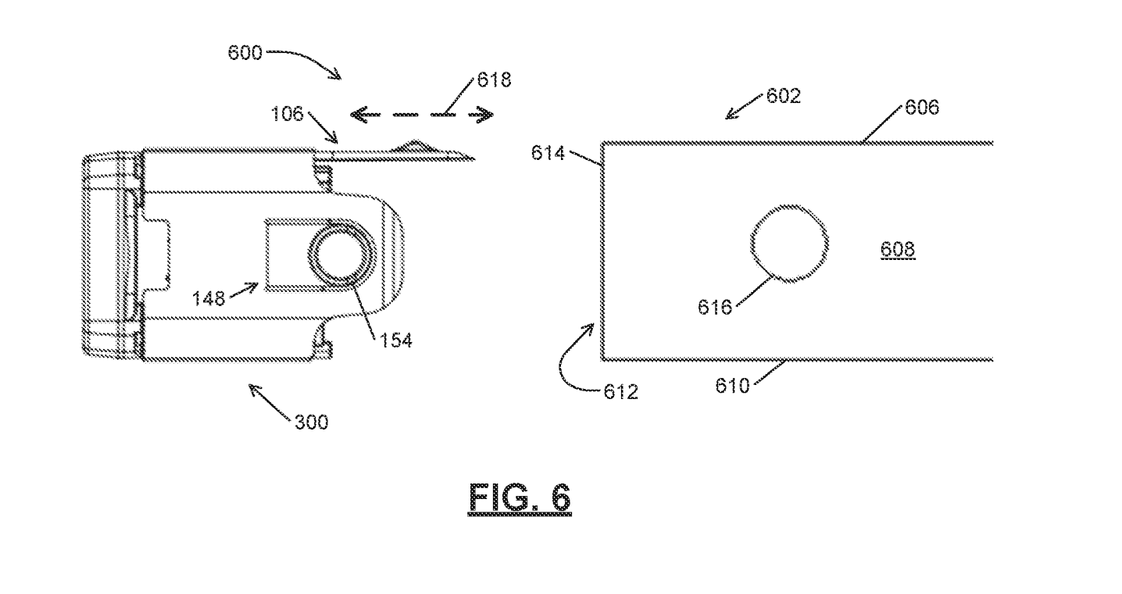
FIG. 6 is a side view of an example hitch assembly of the present disclosure, which includes the lamp hitch mount of FIG. 3 and a vehicle hitch receiver.

FIG. 6 illustrates an example hitch assembly 600 including one or more aspects of the present disclosure. Although the hitch assembly 600 is presented in one specific arrangement in FIG. 6, other embodiments may include the hitch assembly 600 arranged otherwise depending on, for example, the shape, size, configuration, etc. of vehicle hitch receivers, hitch mounts, etc.

As shown in FIG. 6, the hitch assembly 600 generally includes the lamp hitch mount 300 of FIGS. 3-4 and a hitch receiver 602 configured to receive the lamp hitch mount 300. The hitch receiver 602 may be a standard vehicle hitch receiver (e.g., a hitch receiver having a two inch by two inch square tube, etc.) or another suitable, nonstandard vehicle hitch receiver. Although the hitch assembly 600 is shown and described as including the lamp hitch mount 300 and the hitch receiver 602, it should be appreciated that the hitch assembly 600 may include another lamp hitch mount (e.g., a lamp hitch mount including the body 500 of FIG. 5, etc.) positionable in the hitch receiver 602 and/or another hitch receiver configured to receive the lamp hitch mount 300.

The hitch receiver 602 generally includes four sides defining a channel for receiving the lamp hitch mount 300. More specifically, the hitch receiver 602 includes opposing sides 606, 610 extending parallel to each other, and a side 608 extending between the sides 606, 610. While not shown, the hitch receiver 602 further includes a side opposing the side 608. The nonvisible side extends between the sides 606, 610, and is parallel to the side 608. The sides 606, 608, 610 define a channel 612 extending from an open end 614 of the hitch receiver 602.

The side 608 defines an opening 616. Likewise, although not shown, the side opposing the side 608 also defines an opening substantially corresponding to the opening 616. These openings are configured to receive a hitch pin when a hitch is secured to the hitch receiver 602.

The lamp hitch mount 300 is insertable into and removable from the hitch receiver 602, as indicated by arrow 618. For example, a user inserts the lamp hitch mount 300 through the open end 614 and into the channel 612 of the hitch receiver 602, and at the same time biases the interface tabs of either side (e.g., interface tab 154, etc.) to clear the inner surface of the hitch receiver 602. The user then pushes or otherwise guides the lamp hitch mount 300 until the interface tabs of the protrusions align with the openings (e.g., the opening 616, etc.). When the interface tabs align with the openings, the interface tabs snap into the openings and are held in the openings due to applied tension, as explained above. To remove the lamp hitch mount 300 from the hitch receiver 602, the user presses against the interface tabs (e.g., to overcome the applied tension, etc.) and pulls the lamp hitch mount 300 out of the hitch receiver 602, as explained above.

Although the lamp hitch mount 300 of FIG. 6 is shown as being inserted into the hitch receiver 602 with the side 106 aligning with the side 606, it should be appreciated that the lamp hitch mount 300 may be inserted into the hitch receiver 602 in a different manner. For example, the lamp hitch mount 300 may be inserted into the hitch receiver 602 with the side 106 aligning with the side 610 if desired.

Figure 7:
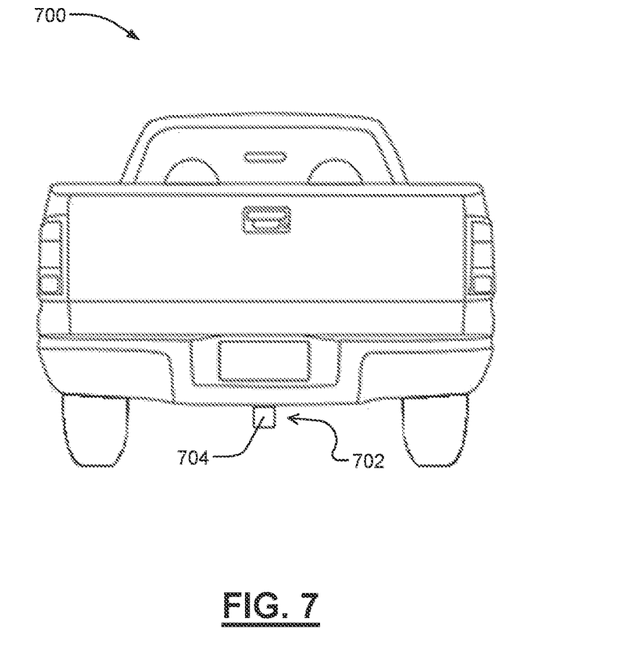
FIG. 7 is a rear view of an example vehicle, which includes a lamp hitch mount and a hitch receiver of the present disclosure.
Figure 8:
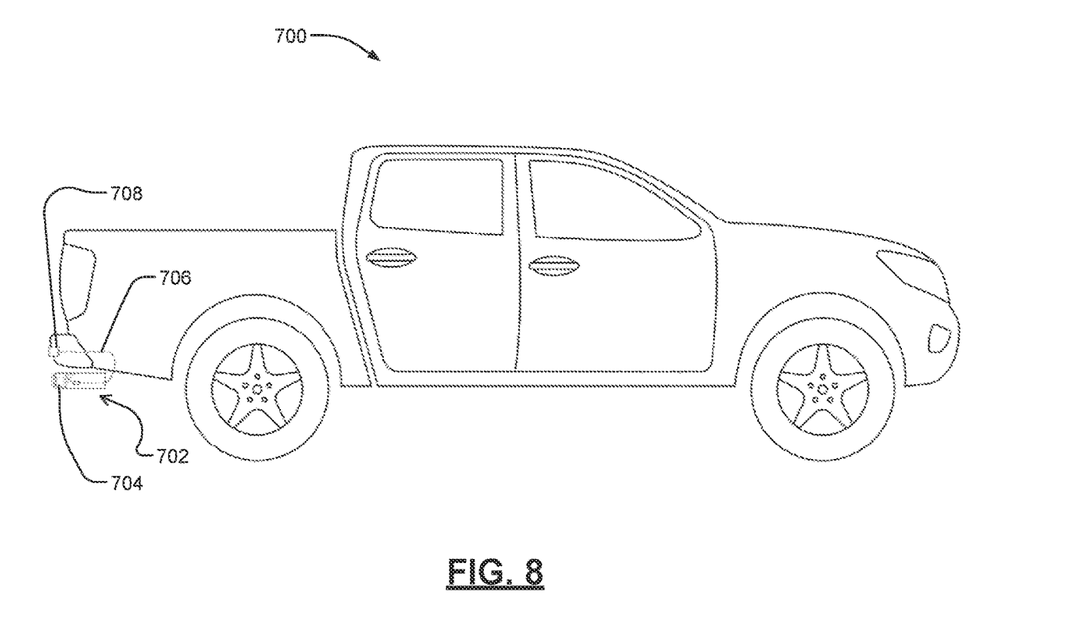
FIG. 8 is a side view of the vehicle of FIG. 7 showing cable routing for a lamp in the lamp hitch mount.

FIGS. 7-8 illustrates an example vehicle 700 in which one or more aspects of the present disclosure may be implemented. As shown in FIG. 7, the vehicle 700 is a truck including a hitch receiver 702 and a lamp hitch mount 704 detachably coupled to the hitch receiver 702. In such examples, the lamp hitch mount 704 may be any one of the lamp hitch mounts herein such as the lamp hitch mount 300 of FIGS. 3-4, etc. and/or may include any one of the hitch mount bodies herein such as the body 100 of FIGS. 1A-1B, the body 500 of FIG. 5, etc. and/or include any one of the lamps herein such as the lamp 200 of FIG. 2A, etc. Although the vehicle 700 is shown in FIG. 7 as including a truck, it should be appreciated that other types of consumer vehicles such as a car, a van, an ATV, a motorcycle, a watercraft, etc. may implement one or more of the lamp hitch mounts herein, bodies herein of lamp hitch mounts and/or lamps herein of lamp hitch mounts.

The lamp attached to the lamp hitch mount 704 is powered and/or controlled via one or more cables 706. For example, and as shown in FIG. 8, the one or more cables 706 may couple to and extend from the lamp in the mount 704, route through the backside of the hitch receiver 702, and then plug into a trailer connector 708 attached to a bumper of the vehicle 700 (e.g., to provide an electrical connection to the lamp (between the vehicle 700 and the lamp, etc.), to provide power to the lamp, etc.). Although the one or more cables 706 are presented in one specific routing arrangement in FIG. 8, other embodiments may include the one or more cables 706 routed otherwise depending on, for example, the location, type, etc. of the trailer connector, the configuration of the lamp, etc.

In various embodiments, the bodies described herein such as the body 100 of FIGS. 1A-1B, the body 500 of FIG. 5, etc. are monolithic bodies. In other words, each body is a single piece construction molded from a material such as resilient plastic (e.g., polyamide, etc.). In some embodiments, the plastic material may be suitable for use in hot and cold climates, and rigid enough to avoid deflection but flexible enough to avoid cracking and damage through many cycles of vibration, cycles of insertion into and removal from a hitch receiver, etc.

In view of the above, the removable lamp hitch mounts herein leverage a uniquely configured body having one or more snap-in tabs extending from flexible sides of the body and configured to insert into openings of vehicle hitch receivers. With this configuration, the lamp hitch mounts may be removeable secured vehicle hitch receivers without requiring hitch pins and clips and/or tools. In this manner, the lamp hitch mounts enable users to quickly and easily install and/or remove aftermarket auxiliary lamps in and/or from existing standard trailer hitch receivers on their vehicles while avoiding modifications to the lamp hitch mounts or the hitch receivers regardless of inexact dimensions or variations of the hitch receivers. Additionally, due to their configuration, the lamp hitch mounts apply tension to the hitch receivers, thereby securing the lamp hitch mounts in position within the hitch receivers while also reducing vibration or rattling of the aftermarket auxiliary lamps.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lamp hitch mount for detachably coupling to a hitch receiver, the lamp hitch mount comprising:
    a body configured to at least partially insert into a hitch receiver, the body including multiple sides defining an opening, a first side of the multiple sides including a first wall and a first protrusion extending from the first wall and a second side of the multiple sides including a second wall and a second protrusion extending from the second wall, the first protrusion including at least one interface tab configured to insert into an opening of the hitch receiver when the body is inserted into the hitch receiver, the second protrusion configured to engage the hitch receiver when the body is inserted into the hitch receiver, and wherein the second side is longer than the first side; and
    a lamp coupled to the body and at least partially positioned in the opening of the body.

2. The lamp hitch mount of claim 1, wherein the first protrusion is configured to apply tension to the at least one interface tab when the at least one interface tab is inserted into the opening of the hitch receiver.

3. The lamp hitch mount of claim 2, wherein the first protrusion includes a resilient material.

4. The lamp hitch mount of claim 1, wherein the at least one interface tab has a shape substantially corresponding to a shape of the opening of the hitch receiver.

5. The lamp hitch mount of claim 1, wherein the at least one interface tab has a generally circular shape.

6. The lamp hitch mount of claim 1, wherein the first protrusion includes an inclined surface having a first end facing the lamp and a second end opposing the first end, wherein the second end extends a greater distance from the first wall of the first side than the first end, and wherein the at least one interface tab is positioned adjacent to the second end.

7. The lamp hitch mount of claim 1, wherein the second side of the multiples sides is adjacent to the first side.

8. The lamp hitch mount of claim 1, wherein the second protrusion of the second side is a prism-shaped protrusion.

9. The lamp hitch mount of claim 1, wherein the second side of the multiple sides includes one or more guide rails extending at least partially along the second wall of the second side.

10. The lamp hitch mount of claim 1, wherein the first side further includes a first end adjacent to the lamp and a second end configured to insert into the hitch receiver, and wherein the at least one interface tab includes multiple interface tabs positioned between the first end and the second end of the first side.

11. The lamp hitch mount of claim 10, wherein each of the multiple interface tabs are curved.

12. The lamp hitch mount of claim 1, wherein the lamp is detachably coupled to the body.

13. The lamp hitch mount of claim 1, wherein the multiple sides of the body define a shape substantially corresponding to an interior channel defined by the hitch receiver.

14. The lamp hitch mount of claim 1, wherein the multiple sides further include a third side, wherein the second side is between the first side and the third side, wherein the third side includes a third protrusion having at least one interface tab configured to insert into another opening of the hitch receiver when the body is inserted into the hitch receiver.

15. The lamp hitch mount of claim 14, wherein the first side and the third side are opposite ones of the multiple sides.

16. The lamp hitch mount of claim 1, wherein the multiple sides of the body further include a third side, and wherein the first side, the second side and the third side of the body define a U-shaped cross-section.

17. The lamp hitch mount of claim 16, wherein the first side, the second side and the third side each include at least one recess configured to receive mounting clips of the lamp.

18. The lamp hitch mount of claim 1, wherein the first side defines a recess at one end, which is configured to receive a mounting clip of the lamp.

* * * * *